United States Patent
Yin et al.

(10) Patent No.: US 8,625,937 B2
(45) Date of Patent: Jan. 7, 2014

(54) MULTIMODE OPTICAL COUPLER

(75) Inventors: Tao Yin, San Jose, CA (US);
Yun-Chung Na, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 13/173,743

(22) Filed: Jun. 30, 2011

(65) Prior Publication Data
US 2013/0004119 A1    Jan. 3, 2013

(51) Int. Cl.
*G02B 6/12*   (2006.01)
*G02B 6/32*   (2006.01)

(52) U.S. Cl.
USPC .............................. 385/14; 385/33; 385/34

(58) Field of Classification Search
USPC ...................... 385/14, 33, 34, 124
See application file for complete search history.

(56) References Cited

U.S. PATENT DOCUMENTS

| | | | |
|---|---|---|---|
| 5,278,687 A | | 1/1994 | Jannson et al. |
| 5,748,822 A | | 5/1998 | Miura et al. |
| 5,774,609 A | | 6/1998 | Backlin et al. |
| 6,810,190 B2 * | | 10/2004 | Manolatou .................. 385/129 |
| 7,228,030 B2 | | 6/2007 | Jones |
| 7,257,283 B1 | | 8/2007 | Liu et al. |
| 2011/0235968 A1 | | 9/2011 | Na |
| 2013/0039620 A1 * | | 2/2013 | Ho et al. ...................... 385/33 |
| 2013/0114924 A1 * | | 5/2013 | Loh et al. ...................... 385/14 |

FOREIGN PATENT DOCUMENTS

| | | |
|---|---|---|
| WO | 2013/003539 A2 | 1/2013 |
| WO | 2013/003539 A3 | 1/2013 |

OTHER PUBLICATIONS

International Search Report and Written Opinion for PCT Application No. PCT/US2012/044553, Mailed on Jan. 17, 2013, 7 pages.
Qian Wang et al., "Thin-film stack based integrated GRIN coupler with aberration-free focusing and super-high NA for efficient fiber-to-nanophotonic-chip coupling," The International Online Journal of Optics, Feb. 22, 2010, vol. 18, No. 5, pp. 4574-4589.
Siegfried Janz et al., "Microphotonic Elements for Integration on the Silicon-on-Insulator Waveguide Platform," IEEE Journal of Selected Topics in Quantum Electronics, 2006, pp. 1402-1415, vol. 12, No. 6.
A. Delage et al., "Monolithically integrated asymmetric graded and step-index couplers for microphotonic waveguides," Optics Express, 2006, pp. 148-161, vol. 14, No. 1.
Tao Yin et al., "31GHz Ge n-i-p waveguide photodetectors on Silicon-on-Insulator substrate," Optics Express, 2007, pp. 13965-13971, vol. 15, No. 21.

* cited by examiner

*Primary Examiner* — Daniel Petkovsek

(57) ABSTRACT

Embodiments of the invention provide optical lenses comprised of layers of material each having a different index of refraction from that of the other layers wherein the layers of material are arranged in order of increasing index of refraction. The lens region is capable of causing an optical beam that enters the lens region to be focused into an output beam that is smaller in at least one dimension. A waveguide is optically coupled to the optical lens and a photodetector is optically coupled to the waveguide. The optical lens is capable of being manufactured using semiconductor processing techniques and is capable of being integrated into an integrated circuit chip.

18 Claims, 6 Drawing Sheets

MULTIMODE OPTICAL COUPLER

BACKGROUND OF THE INVENTION

1. Field of the Invention

The embodiments of the present invention relate generally to optical interconnects, optical communication and data transfer, lasers, optical multimode lenses, optical coupling, and silicon photonics.

2. Background Information

Data transmission and communication using optical-based technologies offers advantages over standard electrical conductor-based systems, such as higher rates of data transmission. Lasers can produce the light (electromagnetic radiation) on which data may be encoded and transmitted. The light produced by a laser can be, for example, electromagnetic radiation in the infrared, visible, ultraviolet, or X-ray region of the electromagnetic spectrum. Silicon-based optics typically use light in the infrared region. For high rates of data transmission, data is encoded using a plurality of wavelengths of light which are then multiplexed together, sent to an input device, demultiplexed, and detected at a detector.

Optical data transmission is useful, for example, inside and around personal computers, servers, and data centers as well as more long-range data transmission and communication activities. A challenge is presented by the need to cost-effectively couple small-scale optical devices together to enable data transmission.

DETAILED DESCRIPTION OF THE INVENTION

Embodiments of the invention provide devices capable of coupling multi-mode optical sources with waveguides having one or more substantially smaller dimensions. In an embodiment of the invention, a multi-mode optical source, such as a multimode waveguide, fiber, and or lens, has dimensions in the tens of micrometers and the device to which the light output from the multimode optical source is directed has dimensions in the micrometer or sub-micrometer range. Devices according to embodiments of the invention that are capable of coupling light sources having different dimensions are useful in optical data transmission applications, such as, for example, transferring data in and around personal computers, servers, and data centers as well as for longer-range data transmission. Further, devices according to embodiments of the invention are amenable to fabrication on integrated circuit chips having other components and devices and are amenable to fabrication by semiconductor processing techniques.

Figure 1:
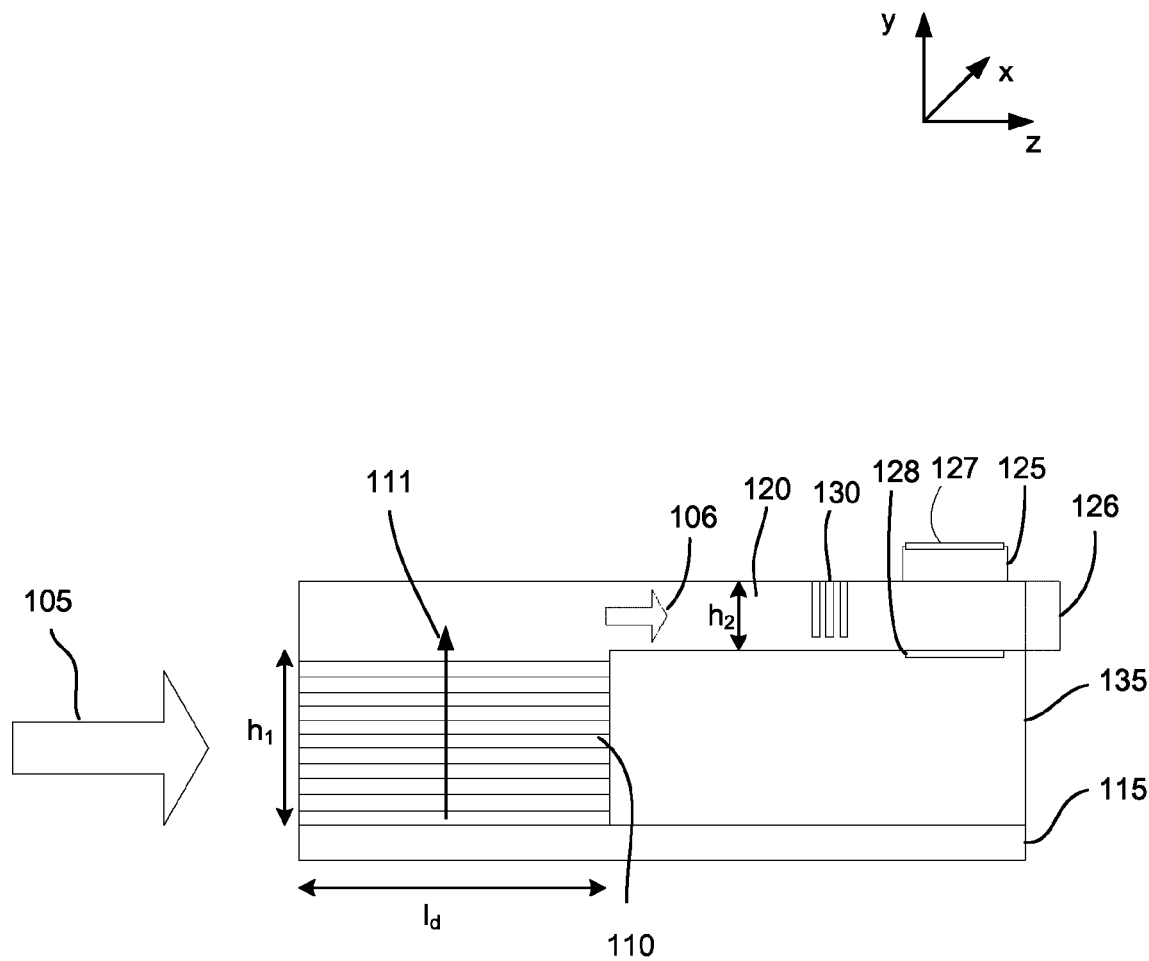
FIG. 1 illustrates a graded-index lens that enables optical focusing for multimode light.

FIG. 1 provides a graded-index lens that enables optical focusing for supported modes of an output waveguide. In an embodiment of FIG. 1, the optical output of the graded-index lens is focused into a waveguide coupled to an optical detector. In FIG. 1, light 105 from an optical waveguide (not shown), such as a multimode optical fiber and or lens, enters a graded-index lens region 110 that is housed on a substrate 115. The substrate 115 is a semiconductor material, such as, for example, silicon or silicon-on-insulator, and the substrate 115 can optionally be the substrate for an integrated circuit (IC) chip that houses other electronic components. The graded-index lens region 110 enables beam focusing into the smaller-dimensioned waveguide region 120. Dotted arrow 106 represents a more focused beam output from the on-chip graded-index lens 110. Light (such as multimode light) that enters the graded-index lens region 110 is focused into the waveguide region 120 and travels to optional photodetector 125. In embodiments of the invention, the graded-index lens 110 is capable of focusing an input optical beam, such as a multimode optical beam, into an output waveguide region 120 that is at least 70 percent smaller in at least one dimension, at least 85 percent smaller in at least one dimension, or at least 90 percent smaller in at least one dimension. The graded-index region 110 is comprised of layers of material in which each layer has a successively higher index of refraction than the previous layer and the index of refraction increases toward a waveguide 120. An arrow 111 indicates the direction of increasing index of refraction. The waveguide region 120 has the same index of refraction as the layer of the graded-index lens region having the highest index. In an embodiment of the invention, the graded-index lens 110 is comprised of $Si_{(1-x)}Ge_x$. The index of refraction increases as the percent composition of Ge in the $Si_{(1-x)}Ge_x$ increases. In an embodiment of the invention, an index of refraction change from 3.5 to 3.56 represents a SiGe materials having from 0 to 10 atomic % Ge. The graded-index region 110 is comprised of at least 4 layers of material, at least 5 layers of material, or a number of layers that is between and including 5 to 10 layers.

In an embodiment of the invention, incoming multimode light 105 from a waveguide, fiber, or lens has dimensions of 20-30 μm by 20-30 μm and the height, $h_1$, and the width (not shown) of the graded-index lens region 110 are 30 μm. The height of the output light 106, $h_2$, is 3 to 4 μm and the width (not shown) is 30 μm. In the embodiment, the focal distance, $f_d$, of the graded-index lens 150 is 300 μm. Other dimensions for the incoming light, the light output waveguide, and the focal distance are possible. For example, multimode fibers that act as optical waveguides also are commercially available in 50 μm and 62.5 μm diameters. In general, embodiments of the invention are useful as photonic links where multimode coupling and optical beam size conversion are needed. Embodiments of the invention are capable of providing at least a 70% coupling efficiency between a multimode light source and a smaller-dimensioned waveguide.

Other materials the graded-index lens 110 can be include, for example, dielectric SiON, polymers, and III-V/II-VI semiconductors. Semiconductor materials that are III-V/II-VI semiconductors are materials that are comprised of elements from group III (3A), group V (5A), group II (2A), and group VI (6A), respectively, of the periodic table. Elements from group III include, for example, aluminum, indium, and gallium, elements from group V include, for example, phosphorous, arsenic, and antimony, elements from group II include, for example, beryllium, magnesium, calcium, and strontium, and elements from group VI include oxygen, sulfur, selenium, and tellurium. In embodiments of the invention, the graded-index lens is GaAs or InP. Other materials and values for ranges of the index of refraction range for the graded-index lens 110 are possible.

An optional echelle grating 130 is interposed between the waveguide photodetector 125 and the graded-index lens region 110. The echelle grating 130 is made up of slits having widths that are close to the wavelength of diffracted light. The slits are filled, for example, with silicon dioxide. The echelle grating 130 is capable of functioning as a demultiplexer which separates the optical beam according to wavelengths of light carrying distinct information streams. The echelle grating can refract different wavelengths at different angles. The different wavelengths are then guided at different locations. The waveguide photodetector 125 is optically coupled to the waveguide 120 and is, for example, a SiGe photodetector, a p-i-n photodiode, p-n photodiode, an avalanche photodiode, and or an edge detector. An exemplary p-i-n photodetector evanescently coupled to a waveguide is described in Yin, Tao, et al., "31 GHz Ge n-i-p Waveguide Photodetectors on Silicon-on-Insulator Substrate," Optics Express, vol. 15, No. 12, 13965 (2007). The waveguide photodetector 125 is coupled to conducting regions 127 and 128 that allow the waveguide photodetector 125 to be driven by electronics (not shown). The electronics for driving the waveguide photodetector 125 and outputting the data contained in incoming light as electrical signal are optionally co-located with the graded-index lens 110 on an IC chip. The substrate 115 can be a substrate housing electronics for data output conversion whereby input light is converted to output electrical signal(s). Conducting regions 127 and 128 are comprised of, for example, p- or n-doped semiconductors, such as p- or n-doped silicon, and or metals. Conducting regions 127 and 128 are not necessarily both comprised of the same material. Region 135 is comprised, for example of silicon, although other materials are also possible. The waveguide photodetector 125 can also optionally be located in region 126.

In general, a waveguide consists of a core and a cladding or substrate at least partially surrounding the core. The refractive index of the core material is higher than that of the surrounding material (the cladding). A waveguide acts a router for light waves through total internal reflection within the core. Waveguides are transparent at the wavelengths at which optical communications operate, such as for example, infrared wavelengths. In general, a mode can be considered to be an electric field distribution that propagates along a waveguide with constant distribution, i.e., the electric field distribution does not vary as it propagates.

Figure 2A:
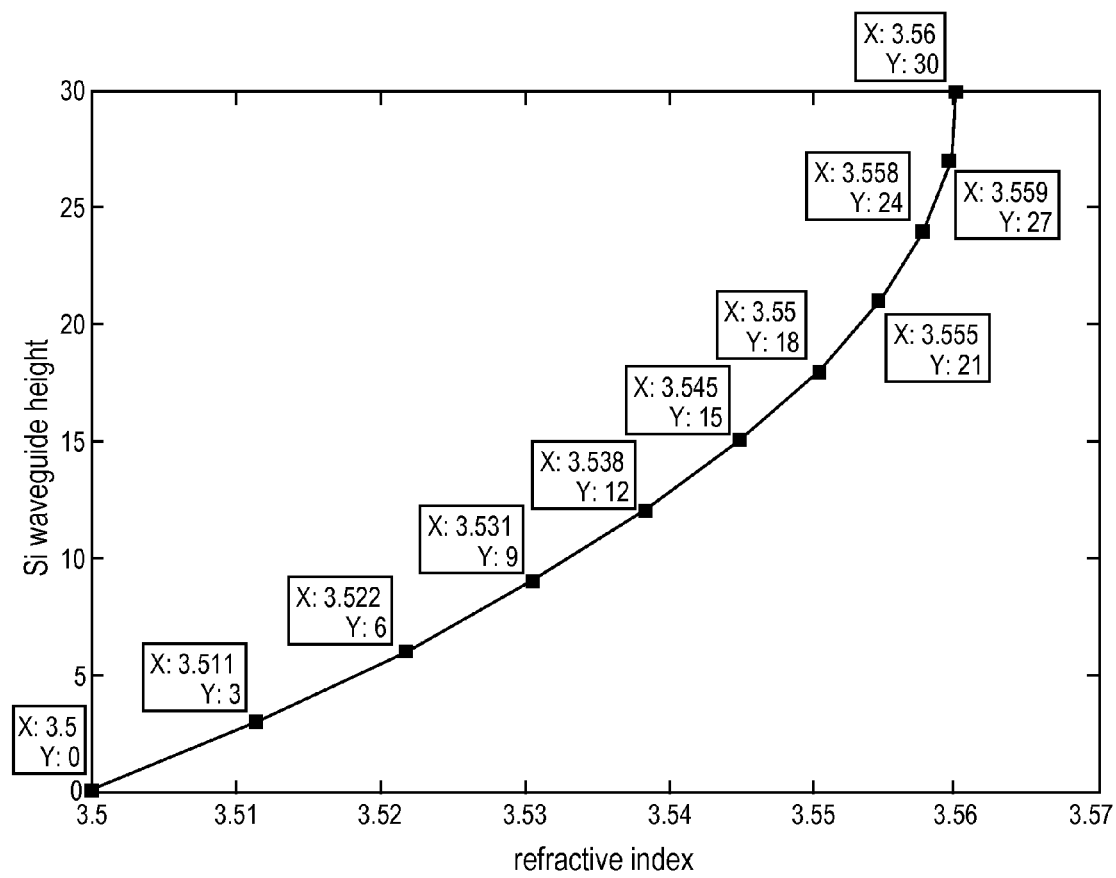
FIG. 2A shows a calculated graded-index profile for a graded-index multimode coupler.

FIG. 2A shows a graph of a calculated graded-index profile in the y-direction for a graded-index multimode lens according to embodiments of the invention. The graph in FIG. 2A was calculated using a paraxial approximation, i.e., when the ray trajectory is almost parallel to the z axis, the ray equation can be simplified as shown in equation (1).

$$\frac{d}{dz}\left(n\frac{dy}{dz}\right) \approx \frac{\partial n}{\partial y} \quad (1)$$

For a graded-index multimode coupler having a refractive index, n=n(y), which is uniform in the x and z directions and which varies continuously in the y direction, the trajectories of the paraxial rays in the y- and z-planes are described by equation (2).

$$\frac{d}{dz}\left(n\frac{dy}{dz}\right) = \frac{dn}{dy} \quad (2)$$

Differentiating based on y=0 as an initial condition, yields equation (3).

$$\frac{d^2 y}{dz^2} = \frac{1}{n(y)} \frac{dn(y)}{dy} \quad (3)$$

Figure 2B:
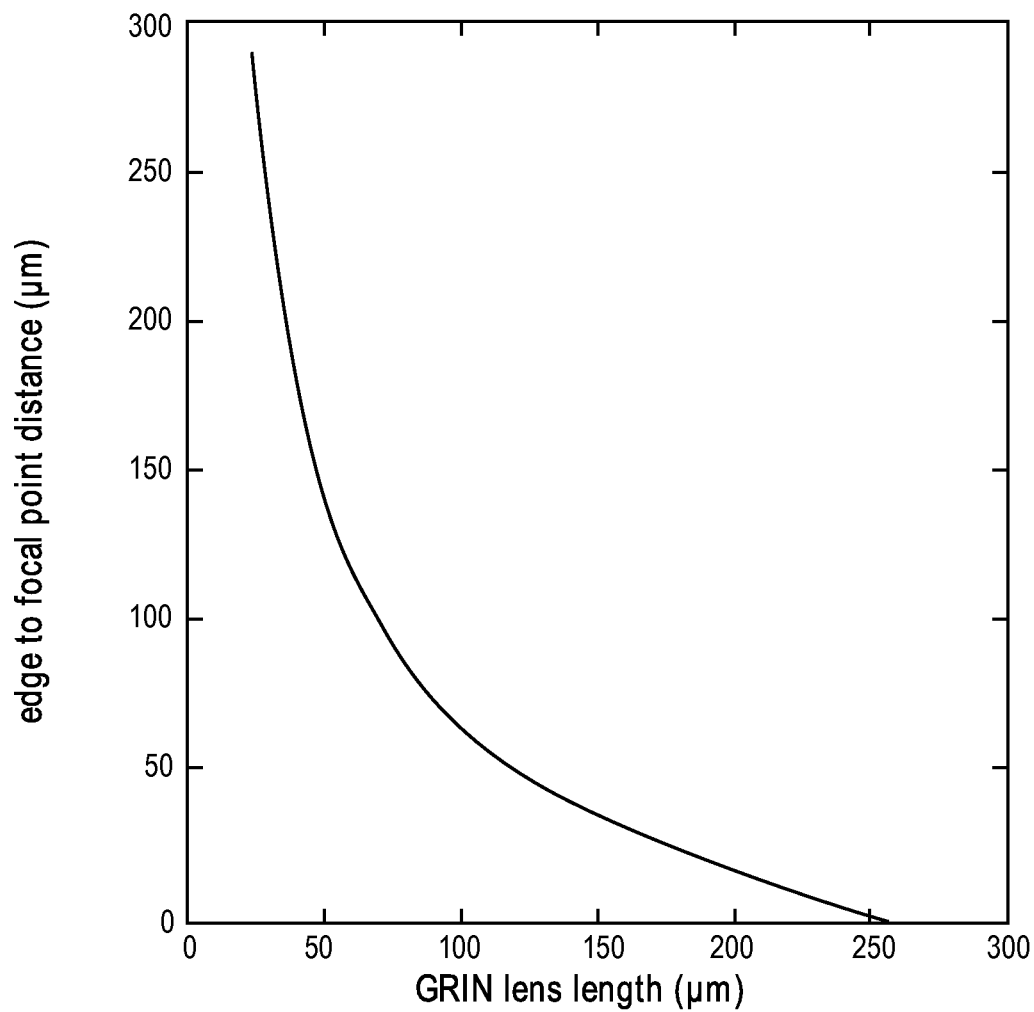
FIG. 2B shows a calculated focal distance for a graded-index multimode coupler.

The graph in FIG. 2A shows the change in index of refraction along the y axis and FIG. 2A was calculated for a SiGe graded-index multimode lens. From FIG. 2A it can be seen that an index of refraction (n) varies from 3.5 to 3.56 and that has a parabolic profile provides beam focusing. FIG. 2B shows the calculation of a focal distance for the graded-index lens of FIG. 2A. A focal distance of 250 μm is obtained for beam focusing by deriving the z position for the condition in which y=0. Other values for an overall change in refractive index and a lens height for a graded-index multimode coupler are also possible.

Ten digitized graded-index SiGe layers having dimensions of 30 μm by 30 μm were modeled using the Beam Propagation Method. An 80% coupling efficiency was found for the fundamental mode coupling for the condition in which the fundamental mode input dimension was 30 μm diameter and the output waveguide dimension was 3 μm by 30 μm. The focal distance was found to be 200 μm which was close to the focal distance calculated with the analytical model. For multimode coupling with up to 20 modes launched together into the SiGe graded-index structure, a coupling efficiency of 73% and a focal distance of 200 μm were obtained. In general, minimizing loss in the fundamental mode is easier to achieve than minimizing loss for additional modes present in the multimode coupling situation. Performing similar calculations for a six digitized layer SiGe graded-index structure having dimensions of 30 μm by 30 μm yielded a coupling efficiency that was about 10% less than what was found for the ten digitized graded-index SiGe layer structure.

Figure 3:
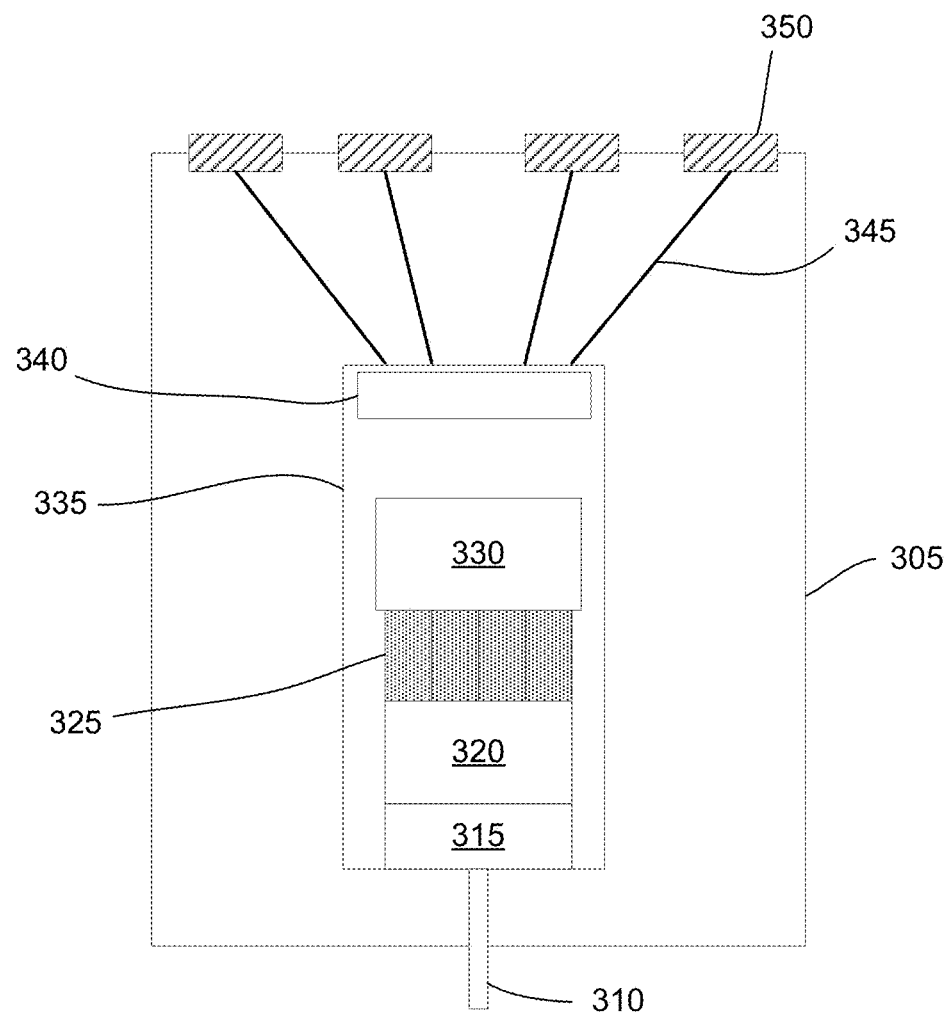
FIG. 3 illustrates a unit for converting an incoming optical signal into an electrical signal.

FIG. 3 shows an embodiment of an optical transceiver unit for converting an incoming optical signal to an electrical signal. The optical transceiver unit of FIG. 3 is useful, for example as part of an optical data transmission system, a computer system, a computing device, and the systems of FIGS. 4 and 5. Other configurations are also possible. In FIG. 3, the conversion unit is housed on board 305. An optical signal enters the conversion unit through multimode fiber 310. The multimode fiber 310 is optically coupled to a graded-index lens region 315 which focuses an incoming optical beam in at least one dimension. The graded-index lens region 315 is optically coupled to a demultiplexing region 320 which splits an incoming optical beam into data-carrying component wavelengths. The component light beams are directed into photodetectors 325. In this embodiment, four photodetectors 325 are shown, although other numbers are possible. Photodetectors 325 are SiGe photodetectors, a p-i-n photodiodes, p-n photodiodes, avalanche photodiodes, or edge detectors. Output from the four photodetectors 325 enters the conversion module 330 which converts the signal from the photodetectors 325 (current signal) into signal that can be used by other devices (amplified voltage signal). In embodiments of the invention, the conversion module 330 is a trans-impedance amplifier (TIA). The TIA converts the current signal from each photodetector into a voltage signal and amplifies it. The gain is called the trans-impedance gain. The graded-index lens region 315, demultiplexing region 320, photodetectors 325, and conversion module 330 are optionally built on a semiconductor chip which is then packaged (packaged semiconductor chip 335) to include coupler 340 which couples output electronic signals from conversion module 330 to board 305. The conversion module 330 converts each electrical signal from each photodetector 325 into a separate signal each of which is output through coupler 340. In this embodiment, board 305 includes metal traces 345 which are electrically coupled to electrical connectors 350. The metal traces 345 are coupled to an input coupler (not shown) attached to the board 305. The input coupler couples with coupler 340 and routes the four (in this example) electrical signals from the conversion module so that each signal is routed to one of the traces 345. Electrical connectors 350 are plugs or sockets, for example. Electrical connectors 350 are capable of connecting with other elements of a computing system. Other configurations are also possible for units that convert optical to electrical signal. For example, other configurations can include, for example, various waveguides, splitters, gratings, and rings, and any possible passive devices before the photo-detector.

Figure 4:
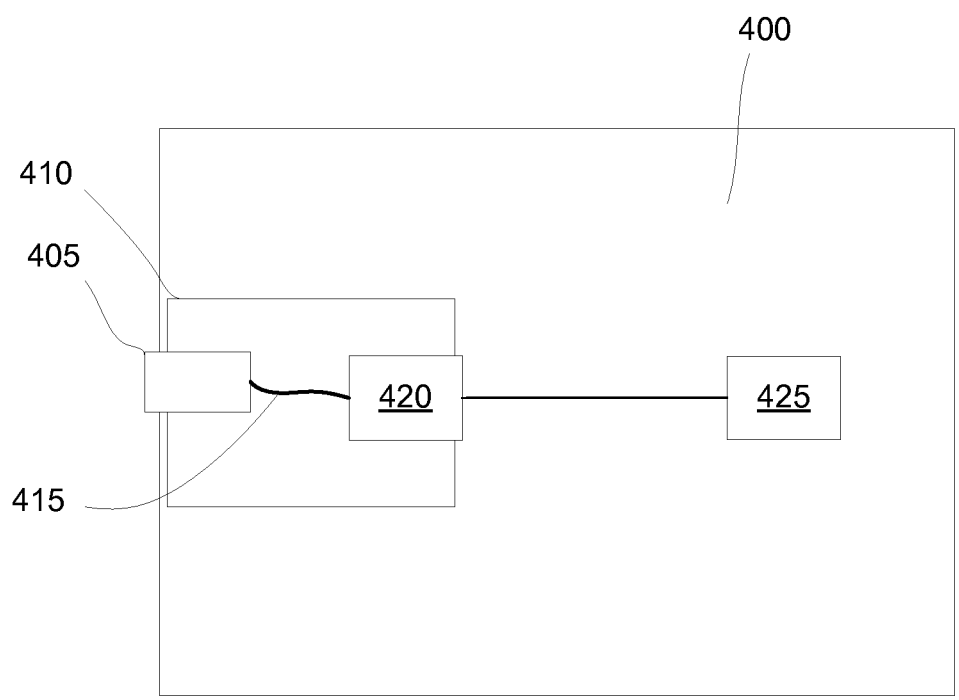
FIG. 4 schematically illustrates a computing system that has optical data input capabilities.

FIG. 4 illustrates schematically a system for data input into a computing system. In FIG. 4, a computing system 400 comprises optical receiver plug receptacle 405 mounted on a substrate 410 and optically connected through optical waveguides 415 to an optical transceiver 420. Although, one optical receiver plug receptacle 405 is shown in FIG. 4, other numbers are possible. The optical receiver plug receptacle 405 is capable of coupling with an optical plug (not shown) and optionally also include the ability to transfer power and or input electrical data. The optical receiver plug and plug receptacle 405 optionally conform to a data transfer standard, such as for example, USB (universal serial bus), firewire, HDMI (high definition multimedia interface), SCSI (small computer system interface), PCIe (peripheral component interconnect express), and SPI (serial peripheral interface bus). The optical transceiver 420 is capable of transforming an incoming optical signal to an electrical signal. The optical transceiver 420 comprises at least one graded-index lens and photodetector (not shown). Optionally, the optical transceiver 420 also comprises an optical demultiplexer (not shown). Optical signal enters the optical transceiver 420, is focused into a waveguide having a smaller dimension by the graded-index lens, and detected by the photodetector. Optionally, the optical signal is demultiplexed before it is detected by the photodetector. The electrical signal from the photodetector is optionally amplified and transmitted to computer subsystem 425. The computer subsystem 425 is, for example, a CIO router (converged input/output for converting optical and electrical signal into one input/output), a platform controller hub, a chipset, a chipset that controls and routes the different types of information flowing into and out of a CPU (central processing unit), a processor, and or a memory device. Data input through the optical transceiver 420 is routed to one or more processors. A computing system is for example, a server, a computer, a portable computing device, a telephone, a scanner, a camera, a monitor, a remote memory device, a HDTV (high definition television), or a television. The system of FIG. 4 is usable with the system of FIG. 5, for example.

Figure 5:
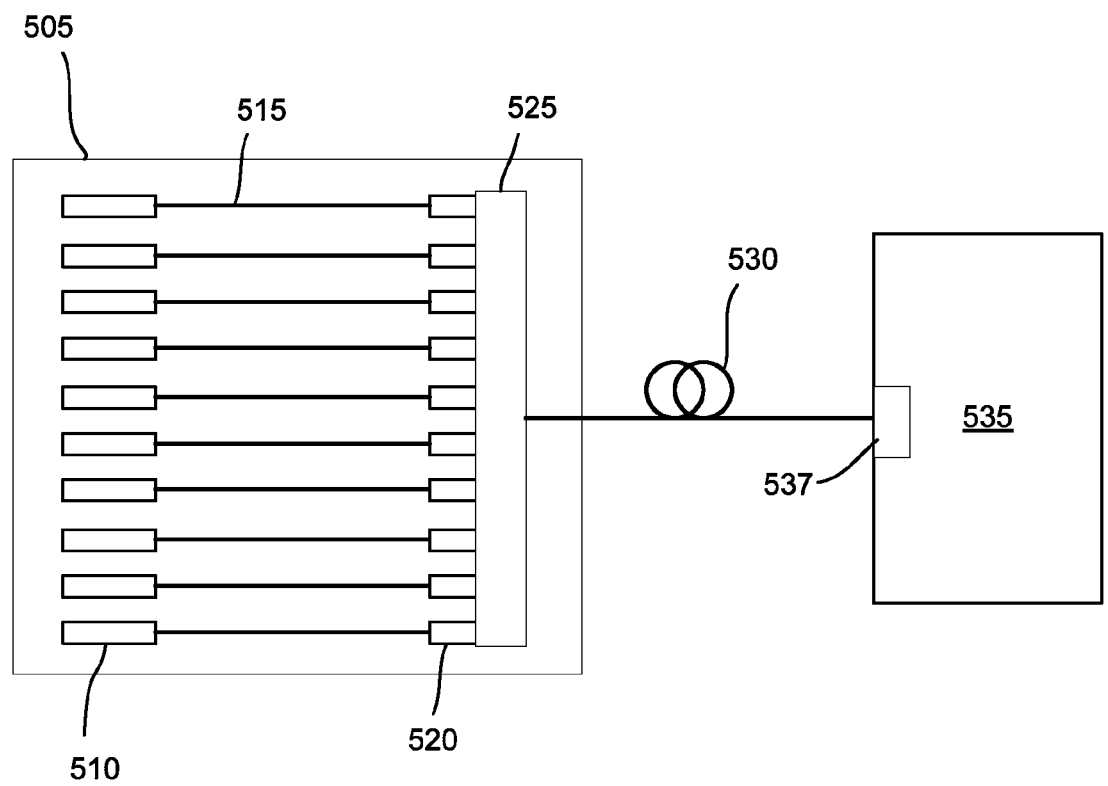
FIG. 5 schematically illustrates an optical data transmission system.

FIG. 5 schematically illustrates an optical data transmission system. In FIG. 5, an integrated circuit chip 505 comprises a plurality of lasers 510. Although ten lasers 510 are shown, other numbers of lasers are possible. In an embodiment of the invention, the lasers are hybrid silicon lasers that are amenable to compact dimensions that allow the integration of many lasers onto a single chip. As few lasers 510 as one laser on a chip is also possible. Optionally, the lasers output different wavelengths of light through the modification of the properties of the associated waveguides or through modification of the lasing material, for example. Some or all of the components of the system of FIG. 5 are optionally integrated into semiconductor chips. Waveguides 515 optically connect the hybrid lasers 510 to optical modulators 520 that encode information. Light output is then capable of passing to the optional multiplexer 525 which channels the output of the optical modulators 520 into an optical waveguide 530. Optionally, the optical waveguide 530 is an optical fiber. In embodiments of the invention, the waveguide or fiber is a multimode fiber. Multimode fibers can enable low-cost and passive alignment enabled coupling. Optical receiver 535 is capable of receiving the light output from the optical waveguide 530 and may be housed on an integrated circuit chip. Optical receiver 535 is comprised of one or more graded-index lenses 537, one or more optional demultiplexers (not shown) that are capable of dividing the input light signal from waveguide 430 into component wavelengths that are carrying information, and a plurality of detectors (not shown) capable of detecting the light input into receiver 535. The detectors are, for example, SiGe photodetectors. One or more integrated circuit chips 505 is optionally part of a computing system having a processor operably connected to the modulators and capable of outputting data as an optical transmission. The optical receiver 535 is optionally part of a second computing system having a processor wherein the data from the photodetectors is receivable by the processor. The second computing system may additionally comprise one or more integrated circuit chips 505 having a plurality of lasers for data transmission and the first computing system may optionally comprise one or more optical receivers 535. A computing system is for example, a server, a computer, a portable computing device, a telephone, a scanner, a camera, a monitor, or a television.

Typically a computer, a portable computing device, or other device comprising a processor, has a processing system, including a processor that is communicatively coupled to one or more volatile or non-volatile data storage devices, such as random access memory (RAM), read-only memory (ROM), mass storage devices such as serial advanced technology attachment (SATA) or small computer system interface hard drives, and or devices capable of accessing media, such as floppy disks, optical storage, tapes, flash memory, memory sticks, CD-ROMs and or digital video disks (DVDs). The term ROM refers to non-volatile memory devices such as erasable programmable ROM (EPROM), electrically erasable programmable ROM (EEPROM), flash ROM, and or flash memory. The processor may also be communicatively coupled to additional components, such as video controllers, SCSI controllers, network controllers, universal serial bus (USB) controllers, and input devices. Communications between elements of the computer system, additional processors, and or the electrical usage monitors can occur using various wired and or wireless short range protocols including, USB, WLAN (wireless local area network), radio frequency (RF), satellite, microwave, Institute of Electrical and Electronics Engineers (IEEE) 802.11, Bluetooth, optical, fiber optical, infrared, cables, and lasers.

In general, an integrated circuit chip is also known as a microchip, a silicon chip, or a chip. A plurality of IC chips are typically built on a semiconductor wafer (a thin silicon disk, having a diameter, for example, of 300 mm) and after processing the wafer is diced apart to create individual chips.

The substrate on which the devices according to embodiments of the invention are built is, for example, a semiconductor wafer, such as a silicon wafer or a silicon-on-insulator substrate. Silicon wafers are substrates that are typically used in the semiconductor processing industry, although embodiments of the invention are not dependent on the type of substrate used. The substrate could also be comprised of germanium, indium antimonide, lead telluride, indium arsenide, indium phosphide, gallium arsenide, gallium antimonide, and or other Group III-V materials either alone or in combination with silicon or silicon dioxide or other insulating materials. One or more graded-index lenses and associated optical devices and electronics can be built on the substrate surface. Additionally, the substrate optionally houses electronics that are capable of performing or assisting in the performance of computing functions, such as data input, data transformation from optical to electronic form, data processing, data output, and or data storage. An optical transceiver can potentially benefit the communication between processor and memory for higher speed and lower power than what is typically achieved with an electrical interconnect.

Embodiments of the invention are capable of being built using standard semiconductor processing techniques as are known in the art of semiconductor manufacturing. Advantageously, devices according to embodiments of the invention are capable of being integrated with silicon-based semiconductor devices and manufactured with silicon-based semiconductor manufacturing techniques.

Persons skilled in the relevant art appreciate that modifications and variations are possible throughout the disclosure and combinations and substitutions for various components shown and described. Reference throughout this specification to "one embodiment" or "an embodiment" means that a particular feature, structure, material, or characteristic described in connection with the embodiment is included in at least one embodiment of the invention, but does not necessarily denote that they are present in every embodiment. Furthermore, the particular features, structures, materials, or characteristics may be combined in any suitable manner in one or more embodiments. Various additional layers and/or structures may be included and/or described features may be omitted in other embodiments.

We claim:

1. A device comprising,
   a substrate housing a lens region comprised of at least four layers of material each having a different index of refraction from that of the other layers wherein the layers of material are arranged in order of increasing index of refraction and wherein the lens region is capable of causing an optical beam that enters the lens region to be focused into an output beam that is smaller in at least one dimension,
   a waveguide optically coupled to the lens region wherein the waveguide has a higher index of refraction than that of at least three of the layers in the lens region, and
   a photodetector optically coupled to the waveguide and capable of detecting light from an optical beam that is in the waveguide.

2. The device of claim 1 wherein the lens region is comprised of five to ten layers of material.

3. The device of claim 1 wherein the waveguide additionally comprises a demultiplexing structure that, for an input optical beam comprised of different wavelengths of light, is capable of separating the input optical beam into different wavelengths carrying distinct information streams.

4. The device of claim 1 wherein for a multimode input beam, the coupling efficiency between the lens region and the waveguide is at least 70%.

5. The device of claim 1 wherein the layers of material are comprised of silicon and germanium.

6. The device of claim 1 wherein the layers of material are comprised of a III-V semiconductor material or a II-VI semiconductor material.

7. The device of claim 1 wherein the waveguide is comprised of silicon and germanium.

8. The device of claim 1 wherein the substrate is a semiconductor substrate housing integrated circuit devices.

9. The device of claim 1 wherein an optical beam that enters the lens region is focused into an output beam that is at least 70 percent smaller in at least one dimension.

10. The device of claim 1 wherein an optical beam that enters the lens region is focused into an output beam that is at least 85 percent smaller in at least one dimension.

11. A device comprising,
    a processor and an optical data input module wherein the processor is operably coupled to and able to receive data from the optical data input module, wherein an optical signal input into the optical data input module is capable of being converted to an electrical signal by the optical data input module, and wherein the optical data input module comprises:
    a substrate housing a lens region comprised of at least four layers of material each having a different index of refraction from that of the other layers wherein the layers of material are arranged in order of increasing index of refraction and wherein the lens region is capable of causing an optical beam that enters the lens region to be focused into an output beam that is smaller in at least one dimension,
    a waveguide optically coupled to the lens region wherein the waveguide has a higher index of refraction than that of at least three of the layers in the lens region, and
    a photodetector optically coupled to the waveguide and capable of detecting light from an optical beam that is in the waveguide wherein the photodetector is capable of converting a received optical signal to an electrical signal output.

12. The device of claim 11 wherein the lens region is comprised of five to ten layers of material.

13. The device of claim 11 wherein the layers of material are comprised of silicon and germanium.

14. The device of claim 11 wherein the layers of material are comprised of a III-V semiconductor material or a II-VI semiconductor material.

15. The device of claim 11 wherein an optical beam that enters the lens region is focused into an output beam that is at least 70 percent smaller in at least one dimension.

16. The device of claim 11 wherein an optical beam that enters the lens region is an output from a multimode source.

17. The device of claim 11 wherein the optical data input module additionally comprises a conversion module that is capable of converting an electrical signal received from the photodetector into an amplified voltage signal output.

18. The device of claim 11 wherein the device is a computer, a portable computing device, a printer, a high-definition television (HDTV), a television, a remote memory device, or a monitor.

* * * * *

UNITED STATES PATENT AND TRADEMARK OFFICE
CERTIFICATE OF CORRECTION

PATENT NO. : 8,625,937 B2  
APPLICATION NO. : 13/173743  
DATED : January 7, 2014  
INVENTOR(S) : Tao Yin Page 1 of 1

It is certified that error appears in the above-identified patent and that said Letters Patent is hereby corrected as shown below:

Please insert:

In column 1, line 2, before BACKGROUND OF THE INVENTION,

-- STATEMENT OF GOVERNMENT INTEREST

This invention was made with Government support under contract number H98230-08-3-0011 awarded by the Department of Defense. The Government has certain rights in this invention. --

Signed and Sealed this
Twenty-eighth Day of June, 2016

Michelle K. Lee
*Director of the United States Patent and Trademark Office*